US012295531B2

(12) United States Patent
Ritscher et al.

(10) Patent No.: US 12,295,531 B2
(45) Date of Patent: May 13, 2025

(54) FLOOR CLEANING APPARATUS

(71) Applicant: Alfred Kärcher SE & Co. KG, Winnenden (DE)

(72) Inventors: Melanie Ritscher, Rudersberg (DE); Alexander Gilich, Stuttgart (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 859 days.

(21) Appl. No.: 17/378,376

(22) Filed: Jul. 16, 2021

(65) Prior Publication Data

US 2021/0338035 A1 Nov. 4, 2021

Related U.S. Application Data

(63) Continuation of application No. PCT/EP2019/051280, filed on Jan. 18, 2019.

(51) Int. Cl.
*A47L 11/40* (2006.01)
*B05B 1/04* (2006.01)

(52) U.S. Cl.
CPC ....... *A47L 11/4025* (2013.01); *A47L 11/4016* (2013.01); *A47L 11/4083* (2013.01); *A47L 11/4088* (2013.01); *B05B 1/04* (2013.01)

(58) Field of Classification Search
CPC ............. A47L 11/4025; A47L 11/4083; A47L 11/4016
See application file for complete search history.

(56) References Cited

U.S. PATENT DOCUMENTS

| | | | | |
|---|---|---|---|---|
| 1,323,918 | A * | 12/1919 | Seraphine | B65F 7/00 220/87.2 |
| 2,630,813 | A * | 3/1953 | Murdoch | A47L 15/16 134/195 |
| 4,741,069 | A | 5/1988 | Helm et al. | |
| 5,286,302 | A * | 2/1994 | Wickham, III | B08B 9/0826 134/34 |
| 8,776,305 | B2 | 7/2014 | Troff et al. | |
| 10,188,252 | B2 | 1/2019 | Nguyen et al. | |

(Continued)

FOREIGN PATENT DOCUMENTS

| | | |
|---|---|---|
| CN | 103220958 | 7/2013 |
| CN | 205568879 | 9/2016 |

(Continued)

*Primary Examiner* — Joseph L. Perrin
*Assistant Examiner* — Kevin G Lee
(74) *Attorney, Agent, or Firm* — Womble Bond Dickinson (US) LLP

(57) ABSTRACT

A floor cleaning apparatus is provided. The floor cleaning apparatus includes a liquid container, which includes a container wall and a container inner space, a tank rinsing device, which includes an inlet and outlets that are in flow connection therewith, through which outlets rinsing liquid is dispensable into the container inner space, wherein the tank rinsing device includes a rinsing channel that is able to be acted upon by way of the inlet and that comprises a first channel part and a second channel part joined thereto, said channel parts forming between them a channel inner space of the rinsing channel, which can be flowed through by the rinsing liquid, and wherein the outlets are arranged on the second channel part and are flow connected to the channel inner space.

35 Claims, 11 Drawing Sheets

(56) References Cited

U.S. PATENT DOCUMENTS

| | | | | |
|---|---|---|---|---|
| 11,000,172 | B2 | 5/2021 | Duguay | |
| 11,089,935 | B2 | 8/2021 | Nguyen | |
| 2012/0097201 | A1 | 4/2012 | Field | |
| 2013/0139347 | A1* | 6/2013 | Troff | A47L 11/4016 15/320 |
| 2015/0196182 | A1 | 7/2015 | Hekman et al. | |
| 2018/0355543 | A1* | 12/2018 | Cinello | D06F 39/02 |
| 2019/0069748 | A1 | 3/2019 | Blumhardt et al. | |
| 2021/0345851 | A1 | 11/2021 | Nguyen et al. | |

FOREIGN PATENT DOCUMENTS

| | | |
|---|---|---|
| DE | 203 17 886 | 6/2004 |
| EP | 0 804 897 | 11/1997 |
| WO | WO 2017/031365 | 2/2017 |
| WO | WO 2017/149116 | 9/2017 |

* cited by examiner

FLOOR CLEANING APPARATUS

CROSS-REFERENCE TO RELATED APPLICATIONS

This application is a continuation patent application of international application number PCT/EP2019/051280, filed on Jan. 18, 2019, which is incorporated herein by reference in its entirety and for all purposes.

FIELD OF THE INVENTION

The present invention relates to a floor cleaning apparatus, comprising a liquid container, which comprises a container wall and a container inner space, a tank rinsing device, which comprises an inlet and outlets that are in flow connection therewith, through which outlets rinsing liquid is dispensable into the container inner space.

BACKGROUND OF THE INVENTION

A floor cleaning apparatus of that kind, configured as a scrubber-dryer machine, is described in DE 10 2010 038 422 A1. An external supply conduit, for example a hose conduit provided with a standard connecting element, is connectable to the inlet. Rinsing liquid, in particular water, can be fed to the tank rinsing device. The tank rinsing device comprises a hose conduit configured as a ring conduit, on which a plurality of outlets are arranged. The rinsing liquid is sprayed on side walls of a dirty liquid container, whereby same are rinsed off from top to bottom, and contaminants can be discharged via an outlet of the dirty liquid container.

The floor cleaning apparatus described in DE 10 2010 038 422 A1 proves its worth in practice. Nonetheless, it is desirable to provide a floor cleaning apparatus with an improved tank rinsing device.

An object underlying the present invention is to provide a floor cleaning apparatus of the kind stated at the outset, the tank rinsing device of which is configured in a more constructively simple manner.

SUMMARY OF THE INVENTION

In an aspect of the invention, a floor cleaning apparatus in accordance with the invention comprises a liquid container, which comprises a container wall and a container inner space, and a tank rinsing device, which comprises an inlet and outlets that are in flow connection therewith, through which outlets rinsing liquid is dispensable into the container inner space. The tank rinsing device comprises a rinsing channel that is able to be acted upon via the inlet and that comprises a first channel part and a second channel part joined thereto. The channel parts form between them a channel inner space of the rinsing channel, which is adapted to be flowed through by the rinsing liquid. The outlets are arranged on the second channel part and are flow connected to the channel inner space.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
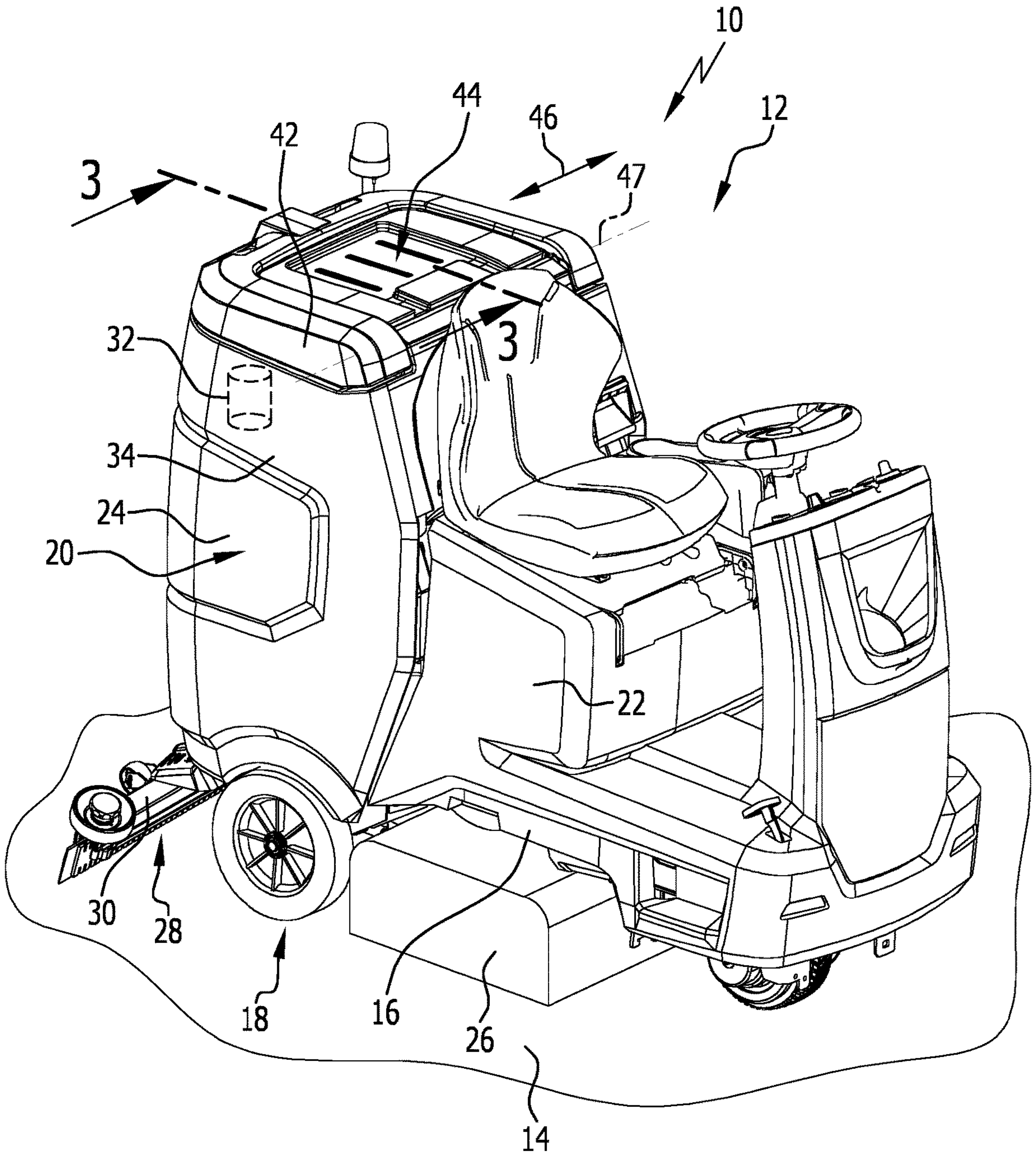
FIG. 1 shows a perspective depiction of a floor cleaning apparatus in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a floor cleaning apparatus, comprising a liquid container, which comprises a container wall and a container inner space, and a tank rinsing device, which comprises an inlet and outlets that are in flow connection therewith, through which outlets rinsing liquid is dispensable into the container inner space. The tank rinsing device comprises a rinsing channel that is able to be acted upon via the inlet and that comprises a first channel part and a second channel part joined thereto, said channel parts forming between them a channel inner space of the rinsing channel, which can be flowed through by the rinsing liquid. The outlets are arranged on the second channel part and are flow connected to the channel inner space.

In the floor cleaning apparatus in accordance with the invention, the rinsing channel can be formed in a constructively simple manner by two mutually joined channel parts being provided, which define between them the channel inner space. The channel parts form channel walls of the rinsing channel. Rinsing liquid flows through the channel inner space from the inlet to the outlets and is discharged there. It has been shown in practice that a constructive simplification can be achieved by way of the mutually joinable channel parts. For example, as will be described in the following, in a preferred embodiment of the floor cleaning apparatus, the container wall may form one of the channel parts.

The floor cleaning apparatus in accordance with the invention may take different forms. For example, it may be a ride-on apparatus, a stand-on apparatus, or a walk-behind apparatus.

The floor cleaning apparatus may, in particular, be a scrubber-dryer machine.

The floor cleaning apparatus comprises, in particular, at least one cleaning tool for cleaning the floor surface. The cleaning tool comprises, for example, a cleaning head with at least one driveable brush roller or a driveable disc brush.

The floor cleaning apparatus can preferably pick up contaminated cleaning liquid (dirty liquid) from the floor surface and transfer same into a dirty liquid container. The dirty liquid container may be, for example, the liquid container of the floor cleaning apparatus in accordance with the invention. For picking up the dirty liquid from the floor surface, the cleaning apparatus may comprise, e.g., a dirt pick-up apparatus, which may have a suction bar and a suction assembly for acting upon the container inner space and the suction bar with underpressure.

The container wall comprises, for example, a bottom wall of the liquid container, an, in particular peripheral, side wall, and a top wall.

The outlets are preferably directed at the container wall, for example at a side wall and/or a bottom wall or at least portions thereof. For example, the outlets are directed at portions of the container wall that are at a distance from the bottom wall. In this way, dirt particles adhering to the container wall can be struck and rinsed off by the rinsing liquid.

It is favorable if the tank rinsing device is arranged on a top wall, in particular on a foldable lid, of the liquid container. This facilitates, for example, directing the rinsing liquid at upper portions of the side wall arranged at a distance from the bottom wall.

In a preferred embodiment of the floor cleaning apparatus, the container wall may comprise a top wall of the liquid container, in particular as a constituent part of a foldable lid of the liquid container.

The lid can preferably be transferred from a closing position closing the container inner space at the top into an open position in which an engagement opening into the container inner space is at least partially unblocked.

In a preferred embodiment of the floor cleaning apparatus, it is favorable if the container wall, in particular the top wall, comprises or forms the first channel part. A separate first channel part can be dispensed with in this way. This simplifies the constructive configuration of the tank rinsing device.

In a preferred embodiment of the floor cleaning apparatus, it is advantageous if the container wall, in particular the top wall, is of double-walled configuration, and if the channel parts are arranged between mutually spaced apart walls of the container wall, wherein the second channel part passes through or engages into recesses in the wall facing toward the container inner space. For example, recesses, formed by openings, in the last-mentioned wall are present in the region of the outlets, and the outlets pass through the openings.

It is favorable if the first channel part forms a receiving part and the second channel part forms an insertion part, wherein the insertion part is accommodated in a recess of the receiving part. The second channel part can be accommodated as an insertion part in the recess of the first receiving part, which forms a receiving part. The channel inner space is formed between the receiving part and the insertion part. An embodiment of that kind has a constructively simple configuration and furthermore offers the advantage of a simple assembly of the tank rinsing device.

The recess is formed, for example, by a moulding of the first channel part, the latter being made, e.g., as a plastic moulded part. When moulding the plastic moulded part, the recess is moulded in the same working step, such that additional manufacturing steps are not necessary.

For example, at least one abutment region may be arranged at the recess, against which the insertion part abuts and is supported.

The recess is, e.g., groove-shaped, the running direction of the groove defining the course of the rinsing channel.

The tank rinsing device preferably comprises a holding part, which at least partially covers the second channel part and is connected to the first channel part, wherein the holding part comprises recesses into which the outlets engage or through which the outlets pass. The second channel part can be held in position on the first channel part by means of the holding part. For example, the holding part covers the insertion part accommodated in the receiving part. The recesses are, for example, openings of the holding part.

The holding part can be connected to the first channel part, for example by a force-locking connection and/or positive-locking connection. For example, a fixation by means of clamping, latching, and/or screwing is conceivable.

The holding part is preferably of plate-shaped configuration. Here, it is favorable, in particular, if the holding part is arranged in a plane defined by the first channel part, in particular the receiving part. In this way, for example, a container wall can be formed with as little unevenness or furrows as possible. The adhesion of dirt particles to the container wall is thereby made more difficult.

The holding part is fixed, e.g., to rims of a recess of the first channel part, in which the second channel part is accommodated.

In a preferred embodiment of the floor cleaning apparatus in accordance with the invention, it is favorable if the holding part is fixed to the container wall of the liquid container, in particular to a top wall, wherein the container wall forms a receiving part for the second channel part.

In a preferred embodiment of the floor cleaning apparatus in accordance with the invention, it is favorable if the container wall, in particular a top wall of the liquid container, forms the holding part, wherein the channel parts are preferably arranged between two walls of the container wall. The first channel part and the second channel part are accommodated between the walls. A wall may simultaneously form the holding part that is fixed to the first holding part.

Passages that form the outlets may be formed in the second channel part.

Provision may be made that nozzle elements that form the outlets are accommodated in passages in the second channel part. By means of the nozzle elements, jets of rinsing liquid shaped in a predetermined form can be dispensed into the container inner space. The second channel part may thus form a nozzle receiving part.

The nozzle elements are held in the passages, for example, by force-locking and/or positive-locking connection, for example by means of clamping and/or latching.

In a preferred embodiment, the nozzle elements are flat jet nozzles or form such flat jet nozzles.

Provision may be made that the orientation of the nozzle elements is variable relative to the second channel part. For example, the operator can, during operation, without disassembly, vary the nozzle elements in their orientation relative to the second channel part.

In addition or alternatively, it is conceivable that the operator releases the second channel part from the first channel part and reconnects the channel parts to one another after varying the orientation of the nozzle elements.

It is favorable if the nozzle elements are inserted into the second channel part from a side facing toward the first channel part and project with an outlet portion forming the outlet beyond the second channel part. In this way, the nozzle elements adopt a defined position in the second channel part. For example, the nozzle elements may be supported on and preferably seal rims of the passages so that the rinsing liquid can be dispensed through the nozzle elements in a targeted manner.

The second channel part may, in particular, be accommodated in the first channel part in a force-locking and/or positive-locking manner, in particular by clamping and/or latching.

It proves to be advantageous if the second channel part is held on the first channel part by way of an interference fit. In this way, for example, separate connecting elements can be dispensed with.

In particular in combination with the last-mentioned advantageous embodiment, it is advantageous if the second channel part is made from a deformable, elastically squishable material. For example, the second channel part is fixed as an insertion part in the first channel part, which forms a receiving part, by way of an interference fit.

Provision may be made that the first channel part is made from a rigid, non-deformable material. "Rigid, non-deformable" is presently to be understood, in particular, in relation to the quality of the second channel part.

The second channel part advantageously sealingly abuts on the first channel part can thereby sealingly closes the channel inner space. For this purpose, the second channel part is preferably deformable and elastically squishable. A separate seal between the first channel part and the second channel part can be dispensed with.

The second channel part is favorably oversized in relation to the recess formed on the first channel part, as a result of which the second channel part can be held on the first channel part by means of an interference fit.

The second channel part favorably has sealing beads arranged on side walls, or sealing beads are arranged on side walls of the second channel part, which sealingly abut on side walls of the first channel part.

It is favorable if the second channel part does not project beyond the first channel part, except in the region of the outlets. Aside from the outlets, the second channel part may be accommodated, in particular completely, as an insertion part in the first channel part.

The second channel part is preferably of one-piece configuration, whereby a constructive simplification can be achieved.

In a preferred embodiment, provision may be made that the second channel part is of multipart configuration.

It is advantageous if the second channel part is arrangeable on the first channel part in only one relative arrangement. This facilitates the assembly of the tank rinsing device, because the relative arrangement of the channel parts is directly visible to the installer.

In particular, the second channel part is insertable into the receiving part in only one orientation when the first channel part forms a receiving part.

It may be advantageous if the rinsing channel does not form a self-enclosed ring conduit. This can presently be understood to mean, in particular, that the rinsing channel has a beginning and an end.

It may be favorable if the rinsing channel has at least one branching at which two or more mutually flow connected segments of the rinsing channel are oriented at an angle to one another.

Provision may be made that the second channel part has outlet portions and connecting portions connecting same, wherein the outlets are arranged on the outlet portions, and if the second channel part has a smaller material thickness and, in particular, width at the connecting portions than at the outlet portions.

For example, the material thickness of the second channel part around passages of the outlet portions is approximately twice as large as at connecting portions.

In an advantageous embodiment of the floor cleaning apparatus, the outlets are arranged, for example, in a plane or substantially in a plane.

For example, the rinsing channel has the inlet.

In a preferred embodiment, provision may be made that the tank rinsing device comprises or forms a supply channel that is flow connected to the rinsing channel and has the inlet.

It may prove to be advantageous if the supply channel is formed at least partially by the container wall and opens into the rinsing channel. For example, the supply channel is moulded at least in sections in the container wall, in particular the top wall.

Alternatively, provision may be made that the supply channel is or comprises a hose conduit, which is connected to the rinsing channel.

The supply channel preferably has a connecting element for connecting an external supply conduit. In particular, said connecting element is a standard connecting element like a connecting nipple or a connecting socket of a plug-in coupling. The connecting element may, in particular, form the inlet.

In a preferred embodiment, the connecting element is arranged outside of the liquid container, in particular on a housing having or forming the liquid container. The operator can thereby connect the supply conduit in a user friendly manner for rinsing the liquid container, without opening same.

Provision may be made that a cover element for the connecting element is arranged on the housing, for example in the form of a pivotable or slideable lid.

In a preferred embodiment, the connecting element may be arranged on a side of the container wall that faces toward the container inner space, in particular on the top wall of the liquid container. For example, the top wall is lifted in order to connect the supply conduit to the connecting element. After being lowered, the top wall can rest on the supply conduit, such that the liquid container is at least partially opened. In case of a rising level in the liquid container, for example due to a clog at the outlet of the liquid container, rinsing liquid can overflow via the opening.

Provision may be made that the container wall has or forms a ventilation opening and/or a ventilation channel. For example, formed in the container wall, in particular the top wall, is a ventilation channel, by way of which the container inner space is connected to the atmosphere and which forms a ventilation opening arranged on the housing. When rinsing the container, air can escape for pressure equalization. The ventilation opening may, in particular, also serve as an overflow opening, from which rinsing liquid can exit.

As already mentioned, the floor cleaning apparatus may be, for example, a ride-on apparatus, a stand-on apparatus, or a walk-behind apparatus.

A preferred embodiment of the floor cleaning apparatus is, for example, a scrubber-dryer machine.

FIG. 1 shows in a perspective depiction an advantageous embodiment of a floor cleaning apparatus 10 in accordance with the invention, attributed with the reference numeral 10

(referred to hereinafter as apparatus 10). The apparatus 10 is configured as a scrubber-dryer machine 12, which is used to clean a floor surface 14. In the present case, the apparatus 10 is a ride-on apparatus, which is controlled by an operator while seated. However, the present invention is not limited to ride-on apparatuses and scrubber-dryer machines 12.

The apparatus 10 comprises a chassis 16, on the underside of which an undercarriage 18 is arranged for traveling on the floor surface 14. A housing 20 of the apparatus 10 is arranged on the chassis 16 on the top. The housing 20 forms two containers for liquid, namely a reservoir 22 for a cleaning liquid, in particular water, and a dirty liquid container 24, into which dirty liquid picked up from the floor surface 14 is transferred.

The dirty liquid container 24 is subsequently referred to simplified as container 24 and is a liquid container within the meaning of the present invention.

For cleaning the floor surface 14, the apparatus 10 comprises a cleaning tool 26 that has a cleaning head. The cleaning head comprises, for example, at least one driveable cleaning roller or at least one disc-shaped cleaning element, which is not depicted. For example, a bristle facing, a sponge-like facing, or a cloth-like facing may be provided. In the present case, the cleaning head has, e.g., two brush rollers.

For picking up the mixture of released dirt and cleaning liquid (dirty liquid), the apparatus 10 has a dirt pick-up apparatus 28. The dirt pick-up apparatus 28 comprises a suction bar 30 and a suction assembly 32 schematically depicted in FIG. 1. By means of the suction assembly 32, the container 24 and the suction bar 30 are acted upon with underpressure for sucking up the dirty liquid.

The container 24 comprises a container wall 34 and a container inner space 36. The container wall 34 encloses the container inner space 36.

Figure 3:
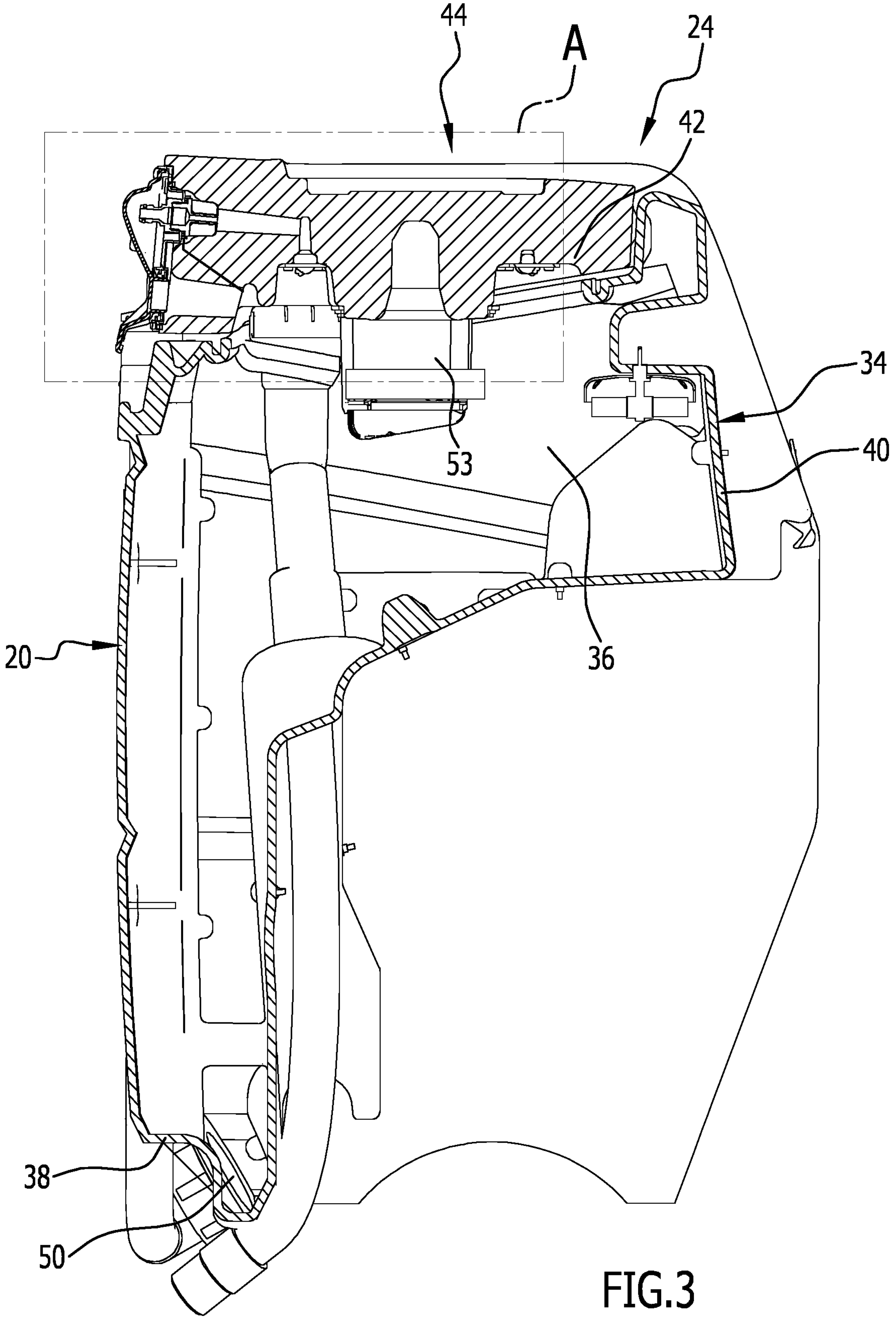
FIG. 3 shows a longitudinal sectional view of a rear portion of the floor cleaning apparatus along the line 3-3 in FIG. 1, which shows a dirty liquid container in a sectional view.

The container wall 34 comprises a bottom wall 38, a side wall 40, and a top wall 42. In the present case (FIG. 3), the container 24 has a cross section approximately in the form of an "L" that is upside down. The base of the container 24 is recessed in the rear region, such that a front portion of the side wall 40 ends substantially horizontally and sectionally forms a base of the container 24.

The top wall 42 is a constituent part of a lid 44. The lid 44 is mounted on the rest of the housing 20 so as to be pivotable about a pivot axis 47 oriented substantially in a transverse direction 46. The lid 44 can be pivoted from a closing position closing the container inner space 36 (FIG. 3) and be transferred into an open position that is not depicted in the drawing. In the open position, an engagement opening into the container inner space 36 is unblocked.

The apparatus 10 comprises a tank rinsing device 48 in order to clean the container 24. In particular, dirt particles adhering to the side wall 40 can be struck and entrained by rinsing liquid acting on the container inner space 36. Rinsing liquid with entrained dirt particles can be discharged by way of an outlet 50 of the container 24 arranged on the base.

The tank rinsing device 48 is arranged on the container wall 34, presently in particular on the top wall 42.

A recess 52 is formed on the bottom side of the top wall 42. The recess 52 is a moulding that can be made in the production of the top wall 42 formed as a plastic moulded part.

The recess 52 is groove-shaped, receding from a plane 54 formed by the top wall 42. Rims of the recess 52 are designated with the reference numeral 56.

In the present case, the recess 52 is not annular or self-enclosed, but rather has a beginning 58 and an end 60. In plan view from the bottom of the top wall 42, the recess is approximately C-shaped, wherein a first branching 62 and a second branching 64 are arranged between the beginning 58 and the end 60 in the running direction of the recess 52. A segment 66 of the recess 52 extends from the beginning 58 to the end 60 and segments 68 and 70 branch off of the branching 62 and 64, respectively. In the present case, said segments 68 and 70 are oriented at an angle to the segment 66 and are formed relatively short. This configuration, as well as the shape of the recess 52 itself, could also be different.

In the present case, the recess 52 is formed and arranged such that it encloses the arrangement, held on the lid 44, with suction opening and float system 53, such that the lid 44 can be of compact construction and still a tank rinsing device 48 can be provided, the outlets of which, as described in the following, can be distributed over a large area of the top wall 42.

Figure 4:
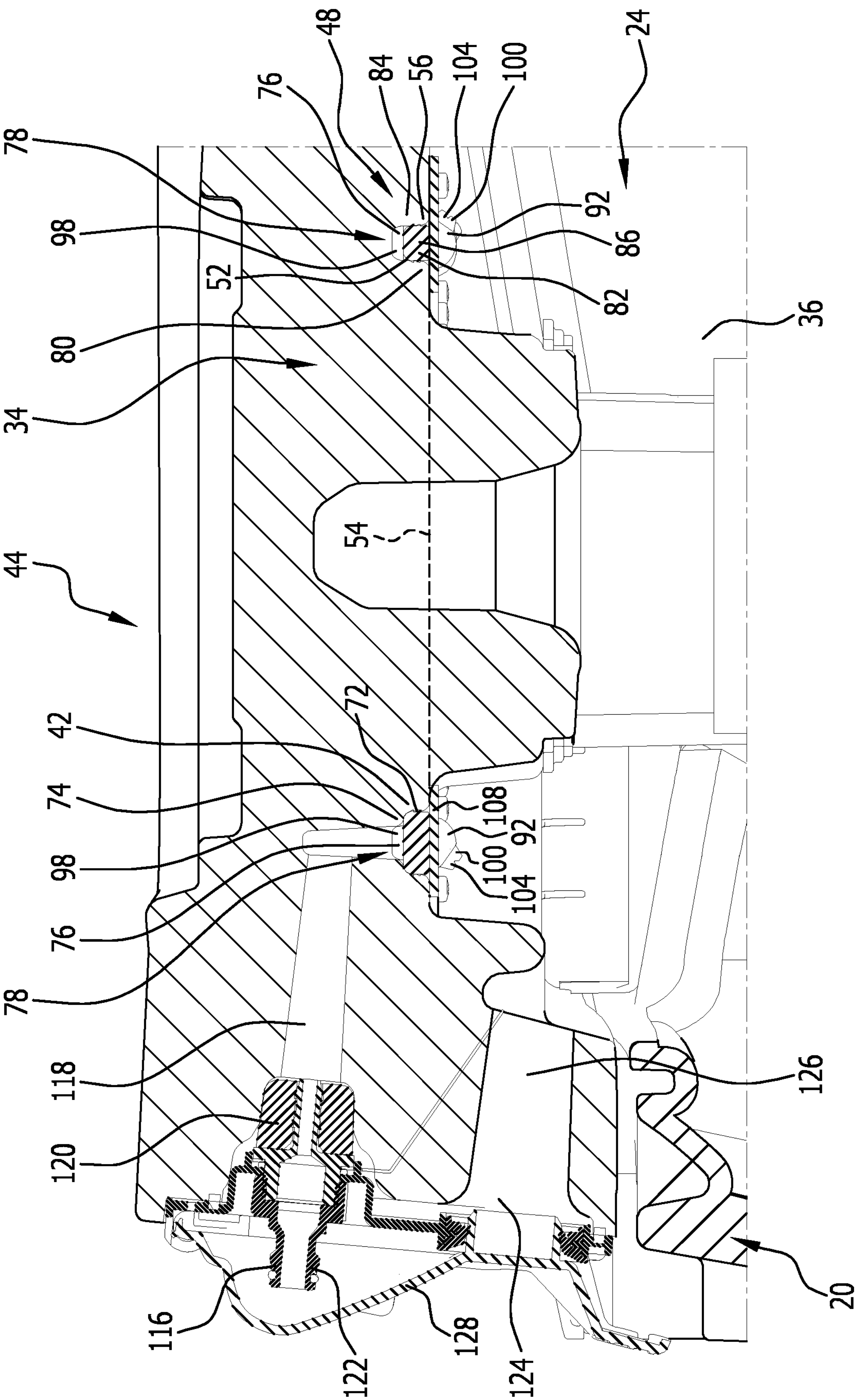
FIG. 4 shows an enlarged depiction of detail A in FIG. 3.
Figure 6:
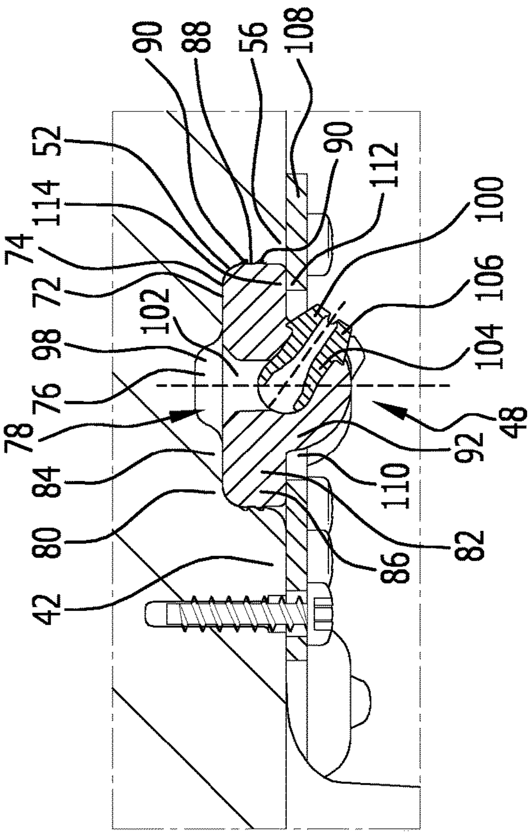
FIG. 6 shows an enlarged depiction of detail B in FIG. 5.

The recess 52 comprises a plurality of widened portions 72 at the segments 66, 68, and 70. At the portions 72, the recess 52 is widened approximately in the shape of a trough, the depression 76 formed by the groove of the recess 52 forming an abutment region 74. The abutment region 74 surrounds the depression 76, which is also present between the portions 72 (FIGS. 4 and 6).

The tank rinsing device 48 comprises a rinsing channel 78. The rinsing channel 78 is formed by a first channel part 80 and a second channel part 82 joined thereto. The channel parts 80, 82 form channel walls of the rinsing channel 78. The first channel part 80 is presently, in particular, the container wall 34, specifically the top wall 42. The second channel part 82 is formed separate from the first channel part 80.

In the case of the apparatus 10, the channel part 80 is of rigid configuration due to the top wall 42 being produced as a plastic moulded part. The channel part 80 forms a receiving part 84 for the channel part 82, which can be inserted as an insertion part 86 into the receptacle of the receiving part 84. In particular, the insertion part 86 can be inserted into the recess 52.

The shape of the insertion part 86 is adapted to the shape of the receiving part 84 and, in particular, to the shape of the recess 52. The shapes of both components of the tank rinsing device 48 correspond with one another and are thereby formed, in particular, such that the insertion part 86 can be inserted into the receiving part 84 in only one orientation. The channel parts 80, 82 thus have a predetermined relative orientation. This facilitates the assembly of the tank rinsing device 48 considerably.

Considering that the shape of the insertion part 86 is adapted to the shape of the recess 52, the rinsing channel 78 has at the locations of the branchings 62, 64 corresponding branchings as well as segments that correspond to the segments 66, 68, and 70.

In the present case, the insertion part 86 is made from a deformable and, in particular, elastically squishable material, for example a rubber material. Here, the insertion part 86 is dimensioned such that it is slightly oversized compared with the dimensions of the recess 52. This makes it possible to fasten the insertion part 86 to the receiving part 84 by means of clamping by way of an interference fit. Here, the insertion part 86 is inserted into the recess 52 under deformation and is accommodated in the recess 52 in a positive-locking manner. The channel parts 80, 82 are thereby joined to one another.

The insertion part 86 has sealing beads 90 on side walls 88. The sealing beads 90 seal off the rinsing channel 78 from the container inner space 36. Alternatively or in addition, separate sealing elements may be provided.

The insertion part 86 is presently formed in one-piece. A multipart configuration is also conceivable.

As already mentioned, the shape of the insertion part 86 is adapted to that of the receiving part 84. Here, the insertion part 86 comprises outlet portions 92, which correspond with the widened portions 72 of the recess 52. Each portion 72 is associated with an outlet portion 92.

At the outlet portions 92, the insertion part 86 has a widening compared with connecting portions 94 that connect the outlet portions 92 to one another. The connecting portions 94 form, in a sense, webs between the outlet portions 92 and correspond with connecting portions 96 of the recess 52 that connect the widened portions 72 to one another.

The material thickness of the insertion part 86 in the region of the connecting portions 94 is smaller than in the region of the outlet portions 92. Around the passages 102, the material thickness at the outlet portions 92 is approximately as large as at the connecting portions 94.

Figure 5:
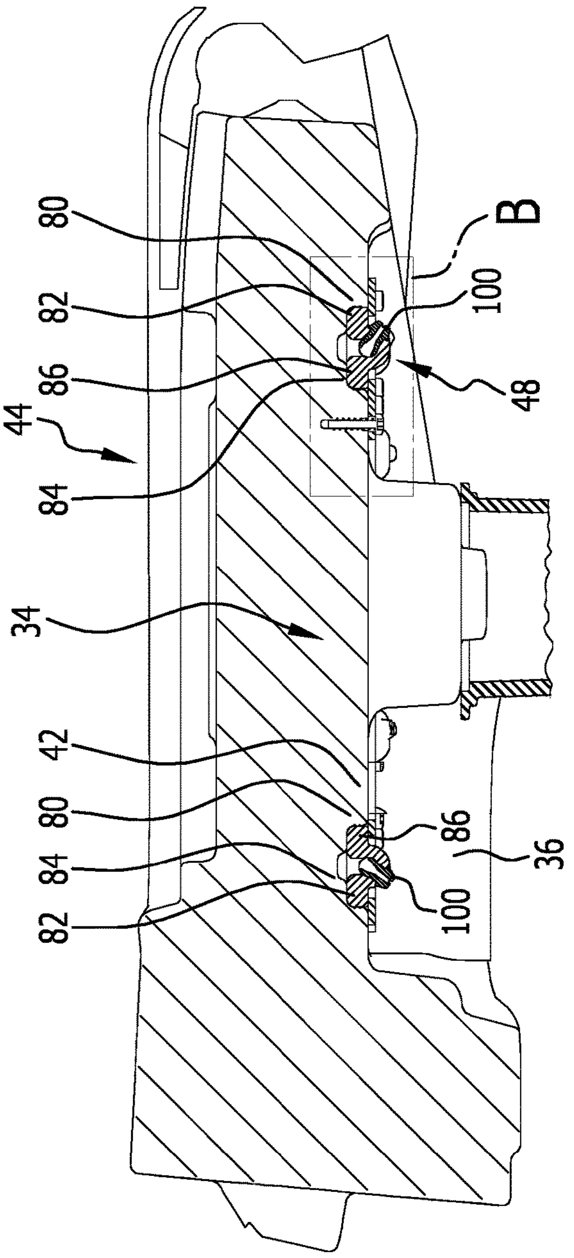
FIG. 5 shows a further longitudinal sectional view of the liquid container of the floor cleaning apparatus in a detailed depiction.

In the inserted state, the insertion part 86 abuts with the outlet portions 92 against the abutment regions 74. The connecting portions 94 are arranged in the connecting portions 96. By way of the depression 76 of the recesses 52, a channel inner space 98 of the rinsing channel 78 is formed between the receiving part 84 and the insertion part 86 (FIGS. 4 to 6). The insertion part 86 closes the channel inner space 98 and seals same.

The tank rinsing device 48 has outlets 100 for the rinsing liquid. The outlets 100 are arranged on the insertion part 86 and, in particular, on the outlet portions 92 thereof. Formed at the outlet portions 92 are the passages 102, which branch off from the channel inner space 98 (in the connected state of the insertion part 86 with the receiving part 84) and are directed in the direction of the container inner space 36. A passage 102 is provided on each outlet portion 92.

The insertion part 86 is of dome-shaped configuration at the outlet portions 92 for accommodating a respective nozzle element 104 that is formed separate from the insertion part 86.

The nozzle element 104 is inserted into the passage 102 and is held on the insertion part 86 by force-locking and/or positive-locking connection, in particular by clamping and latching. The nozzle element 104 thereby passes through the insertion part 86 and projects with an outlet portion 106 beyond the insertion part 86 (FIGS. 4 and 6), into the container inner space 36. The nozzle elements 104 form the outlets 100.

Figure 7:
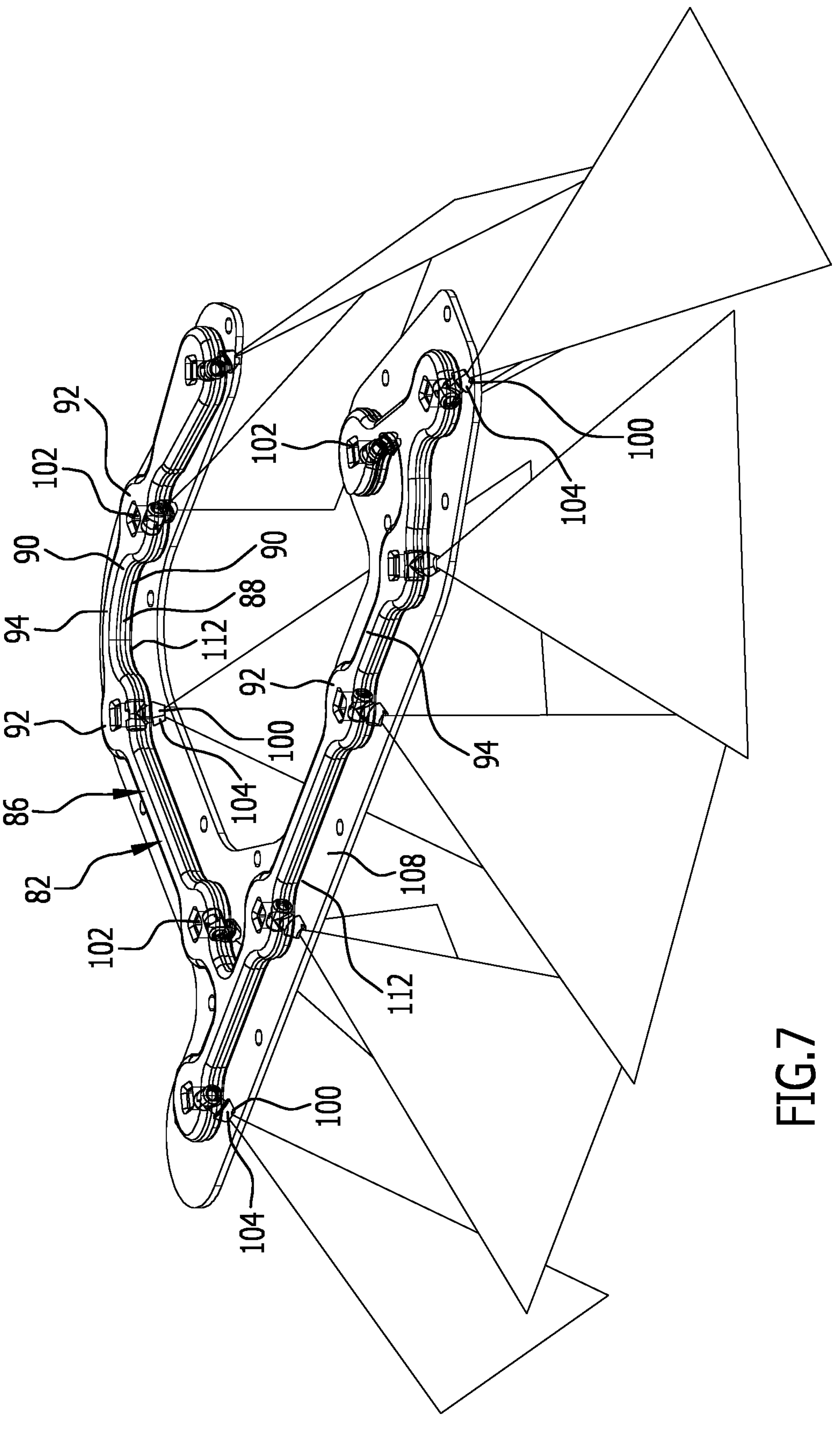
FIG. 7 shows a perspective depiction of components of a tank rinsing device of the floor cleaning apparatus from FIG. 1.
Figure 8:
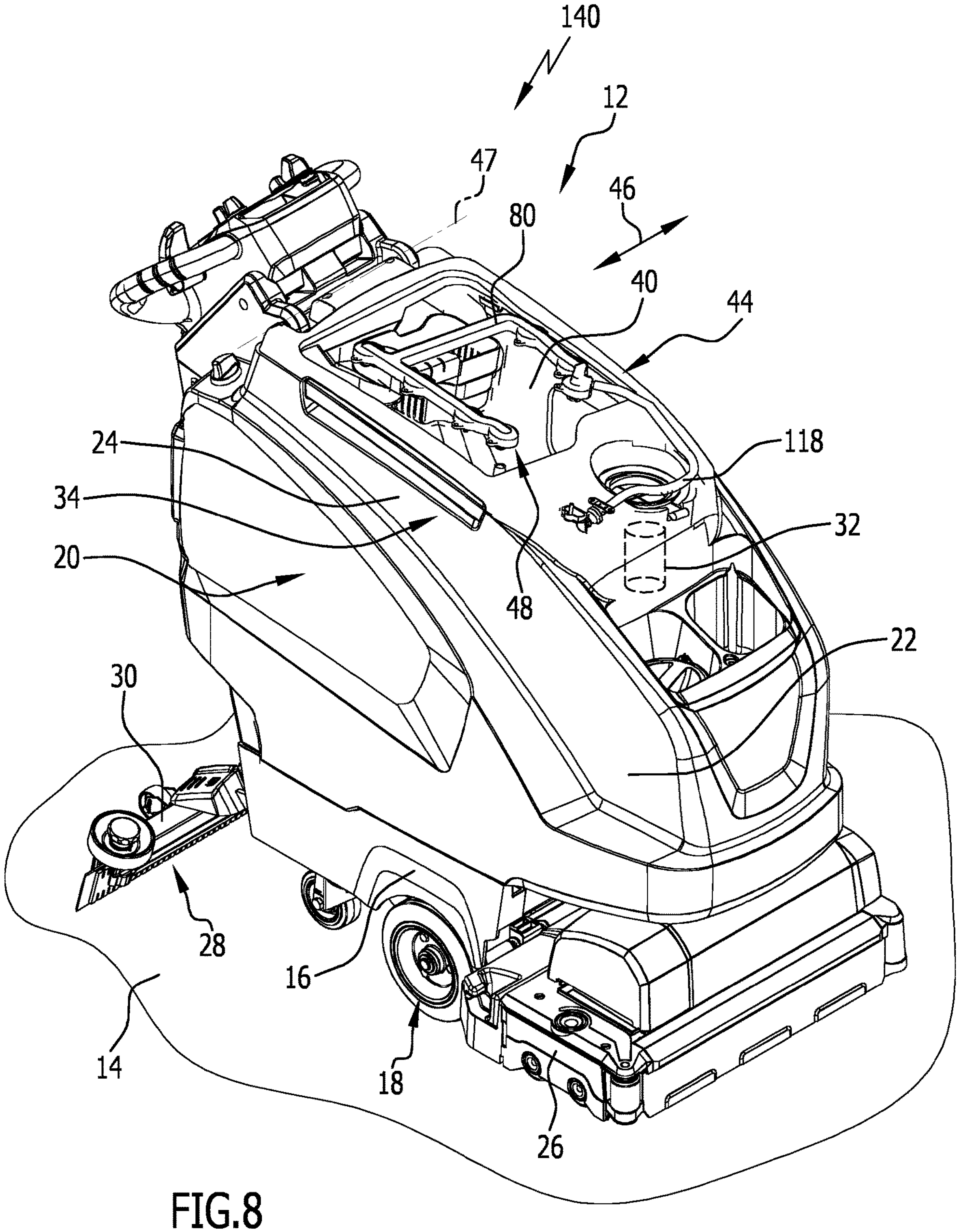
FIG. 8 shows a perspective depiction of a further preferred embodiment of the floor cleaning apparatus in accordance with the invention.

In the present case, the nozzle elements 104 are flat jet nozzles, which provide a respective jet of rinsing liquid that spreads out like a fan (FIG. 7). The nozzle elements 104 are thereby arranged and oriented such that the emerging rinsing jets spreading out like a fan are directed radially outwardly and downwardly. The rinsing jets are directed at the portion of the side wall 40 that ends horizontally, as described above, and further upper portions of the side wall 40. Adhering dirt particles are rinsed off of the container wall 34 by means of the rinsing liquid and fed to the outlet 50.

A respective nozzle element 104 is oriented at an angle to the respective passage 102. In the present case, the angle is about 60°.

It is conceivable that the orientation of the nozzle elements 104 in the insertion part 86 can be varied.

The insertion part 86 is designed such that it does not project beyond the plane 54 of the top wall 42, except in the region of the outlet portions 92. Only the outlet portions 92 project with the nozzle elements 104 over the plane 54 into the container inner space 36.

Figure 2:
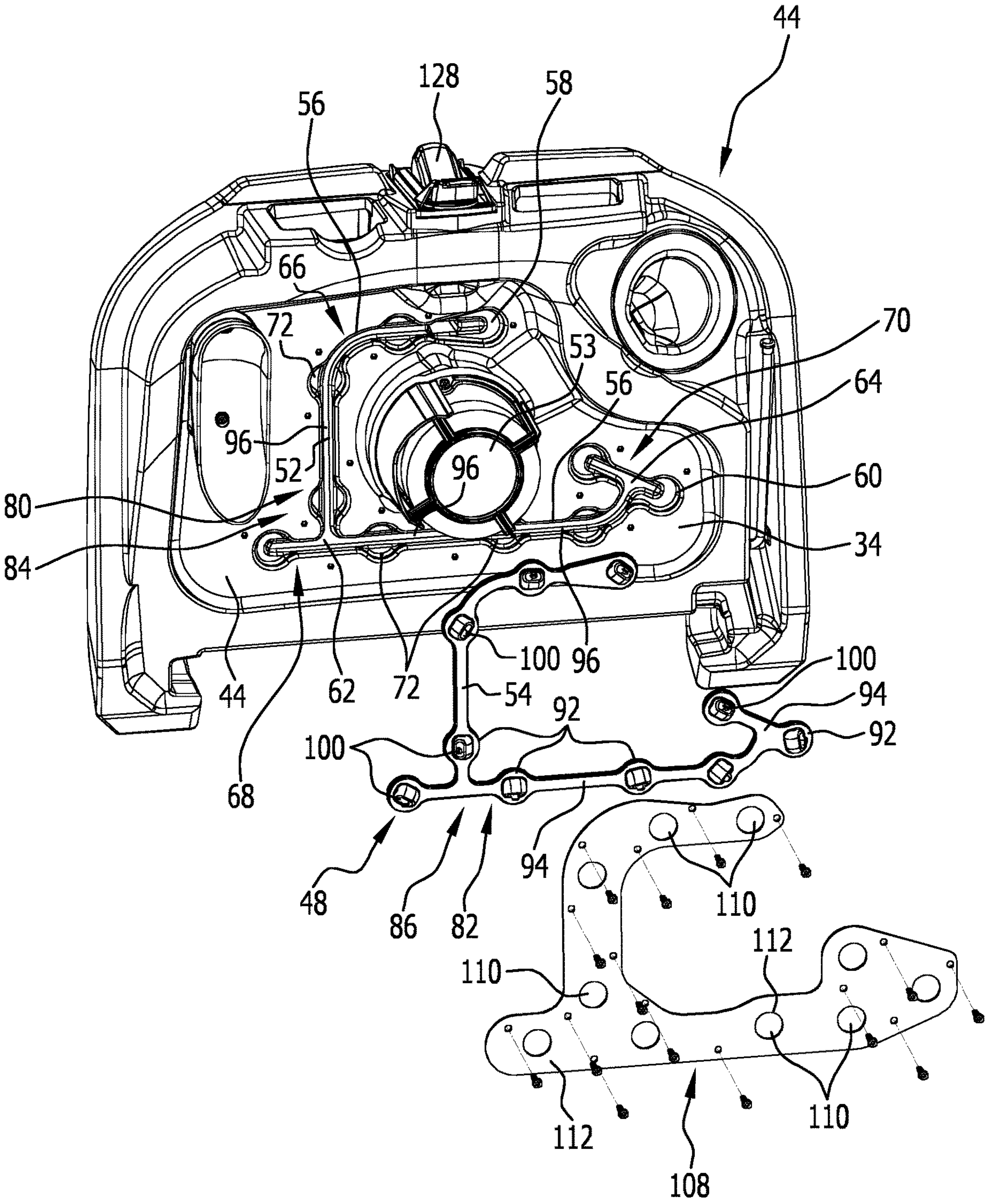
FIG. 2 shows a perspective view of a lid of the floor cleaning apparatus from FIG. 1 in an exploded depiction.

As already mentioned, the insertion part 86 is already held in the receiving part 84 by way of an interference fit. For reliable fixing, the tank rinsing device 48 comprises a holding part 108. The holding part 108 preferably is of plate-shaped configuration and is fixed to the receiving part 84. Here, the holding part 108 is fixed to the rims 56 of the recess 52, presently by screwing (FIGS. 2 and 6).

The holding part 108 covers the insertion part 86 on its side that faces toward the container inner space 36. Recesses in the form of openings 110 are formed in the holding part 108. The outlet portions 92 engage through the openings 110 with the nozzle elements 104. Here, however, a respective rim 112 of the opening 110 abuts on an abutment region 114 of a respective outlet portion 92 (FIG. 6). In this way, the insertion part 86 is reliably fixed in the recess 52.

The tank rinsing device 48 comprises an inlet 116 via which rinsing liquid can be fed. In the present case, the tank rinsing device 48 comprises a supply channel 118 having the inlet 116. The supply channel 118 formed in the lid 44 in sections (FIG. 4). The supply channel 118 opens into the rinsing channel 78.

The portion of the supply channel 118 formed in the lid 44 is adjoined upstream by an insert 120, which provides a seal. The inlet 116 is arranged on the insert 120 on the inlet side.

The inlet 116 is configured in the form of a standardized connecting element 112, presently in the form of a connecting nipple of a plug-in coupling.

An external supply conduit can be connected to the connecting element 122 and the rinsing channel 78 can thereby be acted upon with rinsing liquid.

Moreover, a ventilation opening 124 is provided on the lid 44. The ventilation opening 124 is formed at the end of a ventilation channel 126 that is flow connected to the container inner space 36. When rinsing the container inner space 36, air can exit via the ventilation opening 124 and provide a pressure equalization. Moreover, in case of failure, rinsing liquid can exit via the ventilation opening 124. Said ventilation opening can therefore also be referred to as an overflow opening.

The provision of the ventilation opening 124 also has the advantage that the lid 44 can remain closed during the rinsing operation.

It is favorable if the ventilation opening 124 is arranged below the outlets 100 so that the maximum level of rinsing liquid in the container 24 is lower than the outlets 100. A possible contamination of the supply conduit by way of the outlets 100 can thereby be avoided.

It is understood that indications of position and orientation like, e.g., "on the top", "above", "on the bottom", "below" or the like are to be interpreted in relation to an intended use of the apparatus 10 in which same is positioned on the floor surface 14. The floor surface 14 is taken to be oriented horizontally.

The apparatus 10 comprises a lid 128 on the housing 20. The lid 128 covers the inlet 116 and the ventilation opening 124 during the cleaning operation (FIG. 4). For the rinsing operation, the lid 128 can be moved and, in particular, pivoted into a position, which is not depicted in the drawing, so that the inlet 116 can be accessed.

The configuration of the tank rinsing device 48 enables, for one, the simple manufacture and assembly thereof. For another, there is the advantage that the container wall 34, in particular the top wall 42, has relatively little unevenness, in particular no furrows or undercuts, toward the container inner space 36 due to the use of the insertion part 86 and the covering holding part 108. For this reason, the likelihood is reduced that dirt particles settle on the top wall 42. The care and maintenance of the container 24 is thereby made easier.

An advantageous embodiment of the floor cleaning apparatus in accordance with the invention, which is depicted in FIGS. 8 to 13 and is attributed with the reference numeral 140, will be discussed in the following (referred to hereinafter as apparatus 140). The advantages that have already been explained with the example of the apparatus 10 can also be achieved with the apparatus 140. Reference may be made to the preceding remarks in this regard.

Identical reference numerals are used for like or functionally equivalent features and components. Only the substantial differences between the apparatuses 10 and 140 will be discussed insofar as they are helpful in understanding the present invention.

The apparatus 140 is also configured as a scrubber-dryer machine 12, but said machine being a walk-behind apparatus that is guided by a user.

The container 24 of the apparatus 140 comprises the container wall 34 with a bottom wall 38 that is not depicted in the drawing, the side wall 40, and the top wall 42, which is a constituent part of a lid 44.

The top wall 42 is of double-walled configuration and comprises a first wall 142 and a second wall 144. The wall 142 faces toward the container inner space 36 and thus is the lower wall 142. By contrast, the wall 144 faces away from the container inner space 36 and thus is the outer wall. The wall 144 is arranged on an outside of the apparatus 140.

Figure 9:
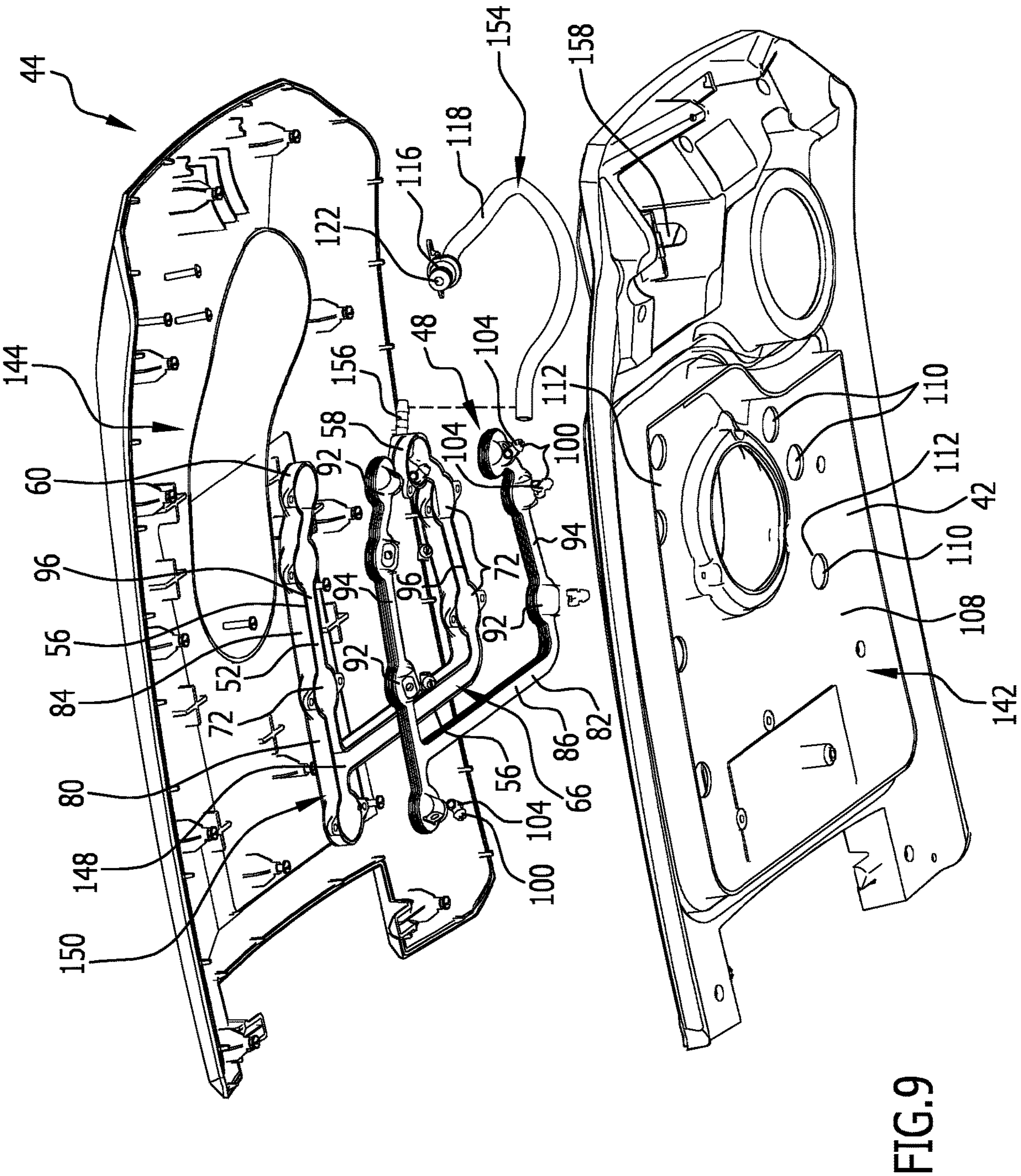
FIG. 9 shows a perspective view of a lid of the floor cleaning apparatus from FIG. 8 in an exploded depiction.
Figure 10:
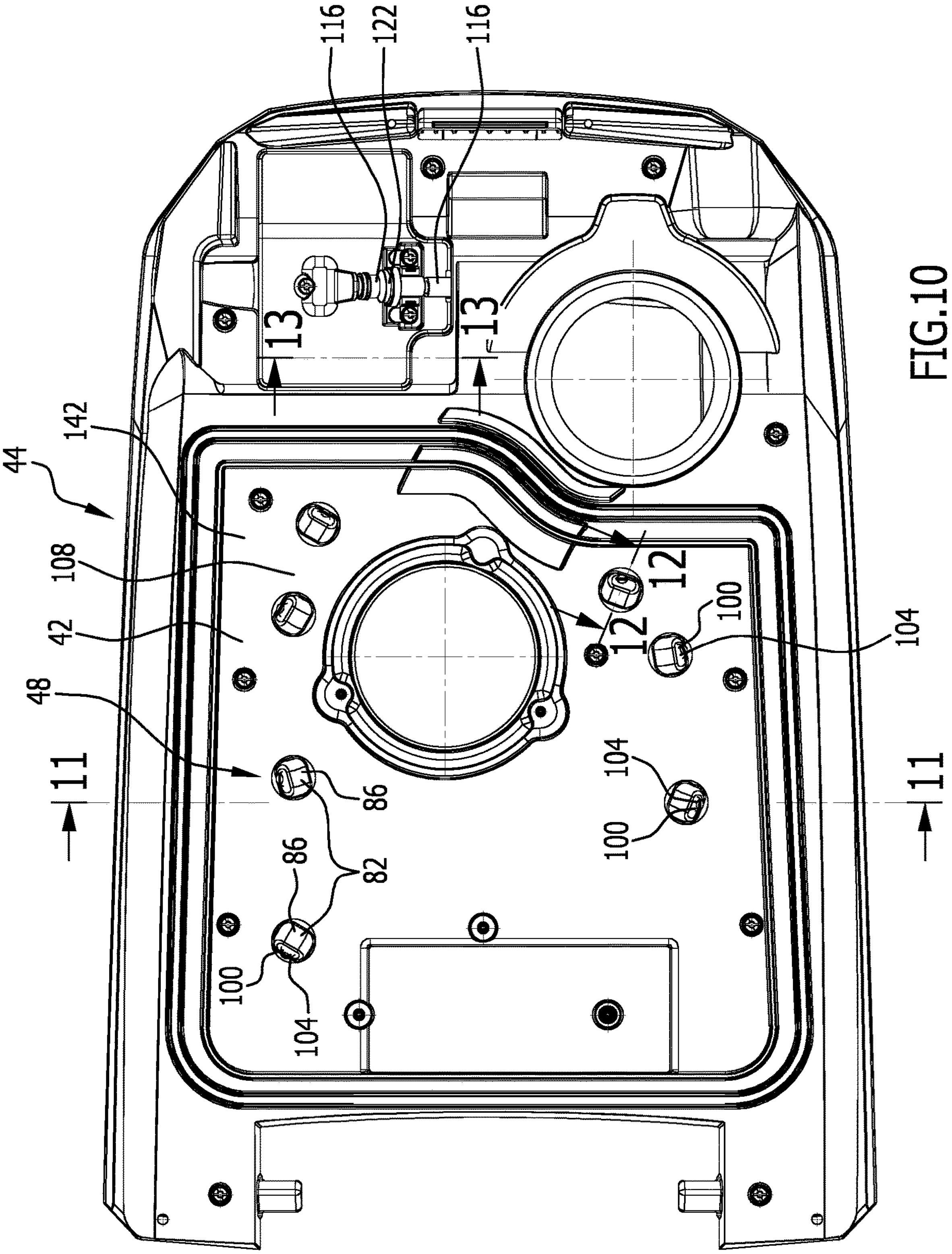
FIG. 10 shows a view of the lid from FIG. 9 from the bottom.
Figure 11:
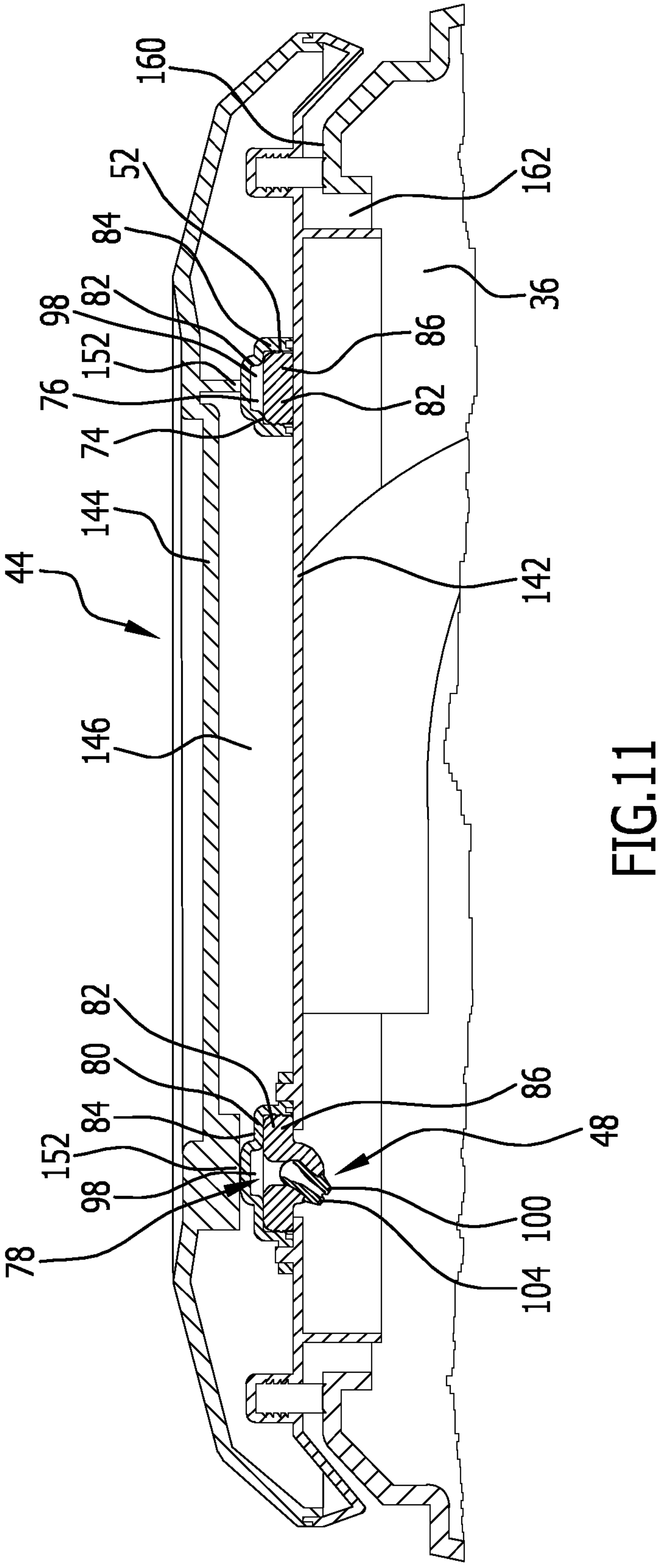
FIG. 11 shows a sectional view along the line 11-11 in FIG. 10.
Figure 12:
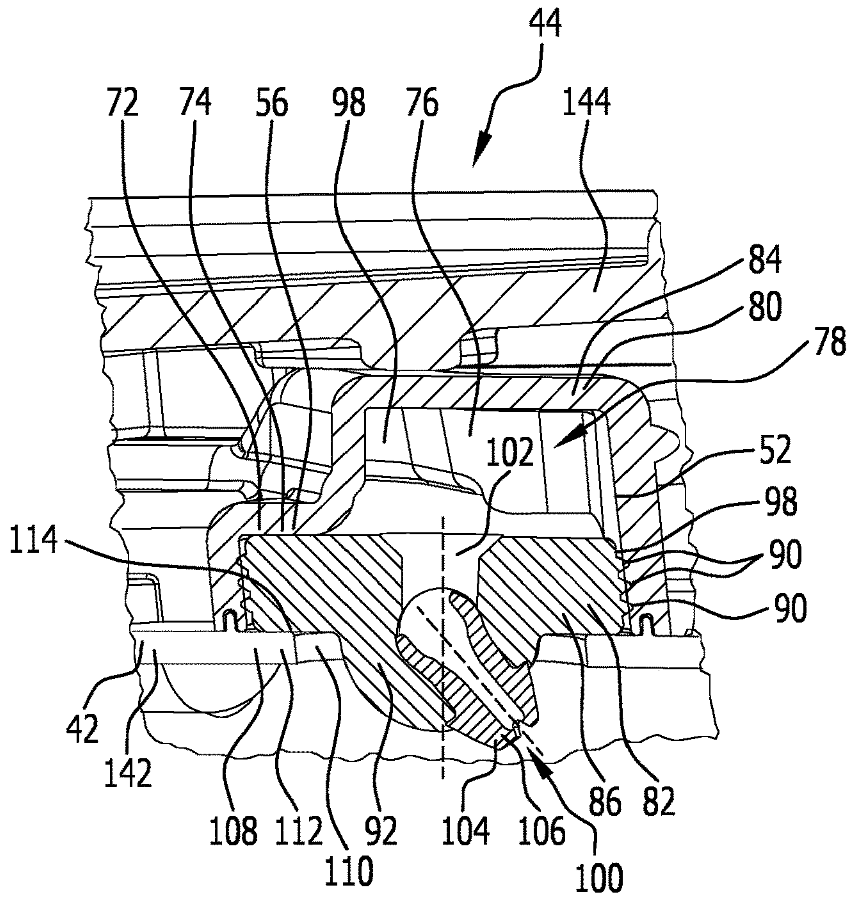
FIG. 12 shows a sectional view along the line 12-12 in FIG. 10.
Figure 13:
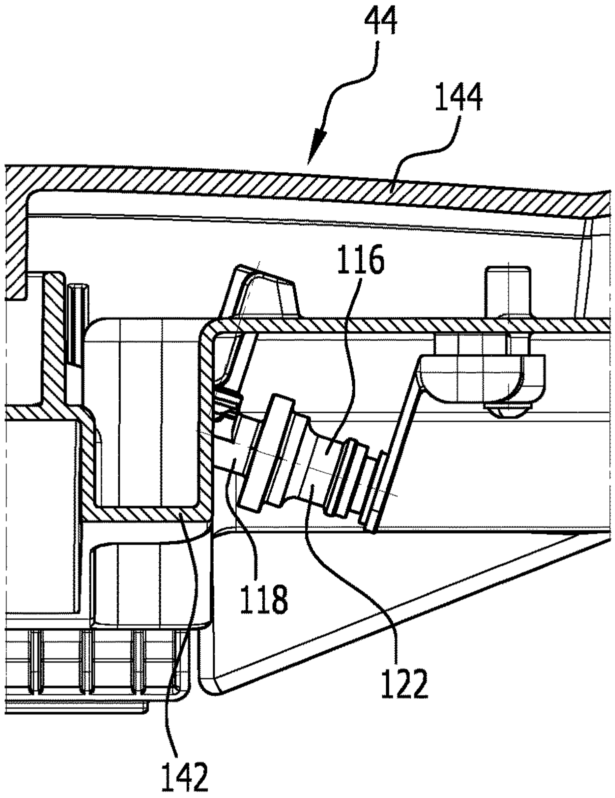
FIG. 13 shows a sectional view along the line 13-13 in FIG. 10.

As can be seen in particular in FIGS. 9 and 11, an interspace 146 is formed between the walls 142, 144. The walls 142, 144 are connected to one another, for example by latching.

The apparatus 140, too, comprises the tank rinsing device 48 with the channel parts 80 and 82 in the form of the receiving part 84 and the insertion part 86, respectively.

In the case of the apparatus 140, the receiving part 84 is formed in the shape of a trough and has the recess 52 that is open toward the bottom. In plan view, the receiving part 84 is approximately C-shaped with a branching 148 and an adjoining segment 150 that projects from the segment 66.

The receiving part 84 is arranged in the interspace 46. In the case of the apparatus 140, the holding part 108 is formed by the top wall 42, in particular by the walls 142 thereof. The openings 110 for the outlet portions 92 and the nozzle elements 104 of the insertion part 86 are formed in the holding part 108.

The insertion part 86 is adapted in its shape to the form of the receiving part 84 and is accommodated therein in a positive-locking and force-locking manner, being held in the recess 52 by an interference fit. Abutment regions 114 abut on rims 112 of the openings 110, and the insertion part 86 abuts on abutment regions 74 of the receiving part 84. Unlike the apparatus 10, the abutment regions 74 are not only arranged on the widened portions 72, but also on the connecting portions 96 (FIG. 11).

The channel inner space 98 of the rinsing channel 78 is formed between the mutually joined channel parts 80 and 82.

The wall 144 preferably has support elements 152, which are supported at least in sections on the receiving part 84. In this way, the double-walled lid 44 is given a higher stability. In addition, the receiving part 84 is secured in its position between the walls 142, 144.

In the apparatus 140, the supply channel 118 is formed by a hose conduit 154. The hose conduit 154 is flow-connected to the receiving part 84 by way of a connecting element 156 (FIG. 9).

The hose conduit 154 is guided in the interspace 146 in sections and exits same out of an opening 158 on the wall 142. The connecting element 122 forming the inlet 116 is arranged below the lid 44 and makes it possible to connect the external supply conduit.

The lid 44 can be opened during the rinsing operation in order to connect the supply conduit to the connecting element 122. The lid 44 can then be closed again. The external supply conduit rests on a rim 160 of the container 24. It is thereby ensured that the engagement opening 162 of the container inner space 36 is open during the rinsing operation. In this way, a ventilation opening is formed via which air can escape. In addition, an overflow opening is provided, by way of which, in the case of failure, rinsing liquid can exit the container 24.

It is favorable if the outlets 100 are arranged above the lowest point of the rim 160, such that a possible rising level of rinsing liquid cannot reach the outlets 100.

REFERENCE NUMERAL LIST

10 floor cleaning apparatus
12 scrubber-dryer machine
14 floor surface
16 chassis
18 undercarriage
20 housing
22 reservoir
24 dirty liquid container
26 cleaning tool
28 dirt pick-up device
30 suction bar
32 suction assembly
34 container wall
36 container inner space
38 bottom wall
40 side wall
42 top wall
44 lid
46 transverse direction
47 pivot axis
48 tank rinsing device
50 outlet
52 recess
53 float system
54 plane
56 rim
58 beginning
60 end
62, 64 branching
66, 68, 70 segment
72 widened portion
74 abutment region
76 depression
78 rinsing channel
80 first channel part
82 second channel part
84 receiving part
86 insertion part
88 side wall
90 sealing bead
92 outlet portion
94, 96 connecting portion

96 connecting portion
98 channel inner space
100 outlet
102 passage
104 nozzle element
106 outlet portion
108 holding part
110 opening
112 rim
114 abutment region
116 inlet
118 supply channel
120 insert
122 connecting element
124 ventilation opening
126 ventilation channel
128 lid
140 floor cleaning apparatus
142, 144 wall
146 interspace
148 branching
150 segment
152 support element
154 hose conduit
156 connecting element
158 opening
160 rim
162 engagement opening

The invention claimed is:

1. A floor cleaning apparatus, comprising:

a liquid container, which comprises a container wall and a container inner space; and a tank rinsing device, which comprises an inlet and outlets that are in flow connection with the inlet, wherein rinsing liquid is dispensable via the outlets into the container inner space, wherein the tank rinsing device comprises a rinsing channel that is able to be acted upon via the inlet and that comprises a first channel part and a second channel part joined to the first channel part, said channel parts forming between them a channel inner space of the rinsing channel, which is adapted to be flowed through by the rinsing liquid, wherein the outlets are arranged on the second channel part and are flow connected to the channel inner space, wherein the first channel part forms a receiving part and the second channel part forms an insertion part, wherein the insertion part is being accommodated in a recess of the receiving part, wherein the recess is groove-shaped, the running direction of the groove defining the course of the rinsing channel, and wherein the second channel part is made from a deformable, elastically squishable material.

2. The floor cleaning apparatus in accordance with claim 1, wherein the tank rinsing device is arranged on a top wall or on a foldable lid of the liquid container.

3. The floor cleaning apparatus in accordance with claim 1, wherein the container wall comprises a top wall of the liquid container as a constituent part of a foldable lid of the liquid container.

4. The floor cleaning apparatus in accordance with claim 1, wherein the container wall comprises or forms the first channel part.

5. The floor cleaning apparatus in accordance with claim 1, wherein the container wall is of double-walled configuration, and wherein the channel parts are arranged between walls of the container wall which are spaced apart from one another, wherein the second channel part passes through or engages into recesses in the wall facing toward the container inner space.

6. The floor cleaning apparatus in accordance with claim 1, wherein the tank rinsing device comprises a holding part, which at least partially covers the second channel part and is connected to the first channel part, wherein the holding part comprises recesses into which the outlets engage or which the outlets pass through.

7. The floor cleaning apparatus in accordance with claim 6, wherein the holding part is at least one of plate-shaped configuration and fixed to rims of a further recess of the first channel part in which the second channel part is accommodated.

8. The floor cleaning apparatus in accordance with claim 6, wherein the holding part is fixed to the container wall of the liquid container which forms a receiving part for the second channel part.

9. The floor cleaning apparatus in accordance with claim 6, wherein the container wall forms the holding part, wherein the channel parts are arranged between two walls of the container wall.

10. The floor cleaning apparatus in accordance with claim 1, wherein passages are formed in the second channel part, which form the outlets, or wherein nozzle elements which form the outlets are accommodated in passages in the second channel part.

11. The floor cleaning apparatus in accordance with claim 10, wherein the nozzle elements are or form flat jet nozzles.

12. The floor cleaning apparatus in accordance with claim 10, wherein the orientation of the nozzle elements is variable relative to the second channel part.

13. The floor cleaning apparatus in accordance with claim 10, wherein the nozzle elements are inserted into the second channel part from a side facing toward the first channel part and project with an outlet portion forming the outlet beyond the second channel part.

14. The floor cleaning apparatus in accordance with claim 1, wherein the second channel part is accommodated in the first channel part in at least one of a force-locking, a positive-locking, a clamping and a latching manner.

15. The floor cleaning apparatus in accordance with claim 1, wherein the second channel part is held to the first channel part by way of an interference fit.

16. The floor cleaning apparatus in accordance with claim 1, wherein the first channel part is made from a rigid, non-deformable material.

17. The floor cleaning apparatus in accordance with claim 1, wherein the second channel part sealingly abuts on the first channel part and thereby sealingly closes the channel inner space.

18. The floor cleaning apparatus in accordance with claim 1, wherein the second channel part has sealing beads arranged on side walls or sealing beads are arranged on side walls of the second channel part, said sealing beads sealingly abutting on side walls of the first channel part.

19. The floor cleaning apparatus in accordance with claim 1, wherein the second channel part is accommodated in the first channel part and the second channel part does not protrude beyond the first channel part, except in the region of the outlets.

20. The floor cleaning apparatus in accordance with claim 1, wherein the second channel part is of one-piece configuration.

21. The floor cleaning apparatus in accordance with claim 1, wherein the second channel part is arrangeable on the first channel part in only one relative arrangement, or is insertable into the receiving part in only one orientation.

22. The floor cleaning apparatus in accordance with claim 1, wherein the rinsing channel forms no self-enclosed ring conduit.

23. The floor cleaning apparatus in accordance with claim 1, wherein the rinsing channel has at least one branching at which two or more mutually flow connected segments of the rinsing channel are oriented at an angle to one another.

24. The floor cleaning apparatus in accordance with claim 1, wherein the second channel part has outlet portions and connecting portions connecting same, wherein the outlets are arranged on the outlet portions, and wherein the second channel part has a smaller material thickness and width at the connecting portions than at the outlet portions.

25. The floor cleaning apparatus in accordance with claim 24, wherein the material thickness of the second channel part around passages of the outlet portions is approximately as large as at the connecting portions.

26. The floor cleaning apparatus in accordance with claim 1, wherein the outlets are arranged in a plane or substantially in a plane.

27. The floor cleaning apparatus in accordance with claim 1, wherein the tank rinsing device comprises or forms a supply channel that is flow connected to the rinsing channel and has the inlet.

28. The floor cleaning apparatus in accordance with claim 27, wherein the supply channel is formed at least partially by the container wall and opens into the rinsing channel, or wherein the supply channel is or comprises a hose conduit, which is connected to the rinsing channel.

29. The floor cleaning apparatus in accordance with claim 27, wherein the supply channel has a connecting element for connecting an external supply conduit.

30. The floor cleaning apparatus in accordance with claim 29, wherein the connecting element is arranged outside of the liquid container.

31. The floor cleaning apparatus in accordance with claim 30, wherein the connecting element is arranged on a housing having or forming the liquid container.

32. The floor cleaning apparatus in accordance with claim 29, wherein the connecting element is arranged on a side of the container wall facing toward the container inner space.

33. The floor cleaning apparatus in accordance with claim 1, wherein the container wall has or forms at least one of a ventilation opening and a ventilation channel.

34. The floor cleaning apparatus in accordance with claim 1, wherein the floor cleaning apparatus is a ride-on apparatus, a stand-on apparatus, or a walk-behind apparatus.

35. The floor cleaning apparatus in accordance with claim 1, wherein the floor cleaning apparatus is a scrubber-dryer machine.

* * * * *